UNITED STATES PATENT OFFICE.

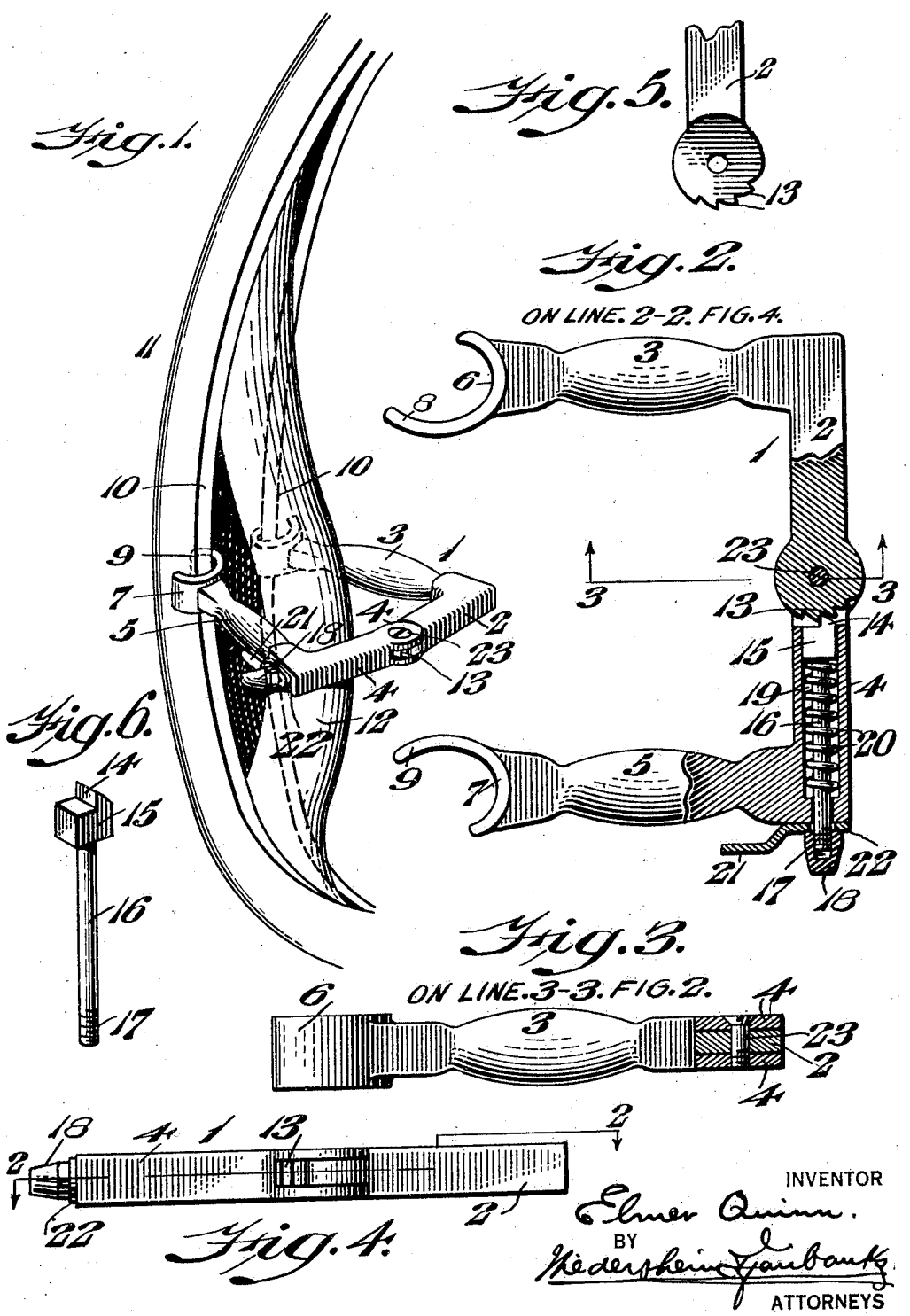

ELMER QUINN, OF PHILADELPHIA, PENNSYLVANIA.

TIRE-VISE.

1,395,296.  Specification of Letters Patent.  Patented Nov. 1, 1921.

Application filed April 2, 1921. Serial No. 457,849.

*To all whom it may concern:*

Be it known that I, ELMER QUINN, a citizen of the United States, residing in the city and county of Philadelphia, State of Pennsylvania, have invented a new and useful Tire-Vise, of which the following is a specification.

In the insertion and withdrawal of inner tubes from automobile tires or shoes, particularly in the larger sizes, considerable difficulty is experienced in holding the juxtaposed edges of the tire open to a sufficient extent during the manipulation of the inner tube, since the walls of such larger tires or shoes are somewhat stiff and rigid, and the object of my present invention is to provide a simple, effective and durable device, comprising arms hinged or pivotally connected together and provided with ratchet or locking mechanism, said arms having hooks on their outer ends, which are adapted to engage the juxtaposed inner annular edges of an automobile tire or shoe, and the construction being such that as said arms are pulled outwardly or away from each other they will be automatically locked and retain the inner peripheral edges of the tire or shoe in open position to the desired extent sufficiently to enable the inner tube to be inserted or withdrawn, a plurality of my novel tire vises being employed in connection with the handling or opening of a single tire or shoe, according to requirements.

To the above ends my invention, consists of a novel construction of a tire vise, comprising arms which are preferably angular and are provided at their outer ends with hooks adapted to engage the juxtaposed inner walls of a tire, the portions of said arms which are hinged or pivotally connected together, being provided with a ratchet and pawl or similar locking mechanism, whereby the arms are retained or locked in open or spread apart position, means being provided for readily actuating the locking device, whereby the hooked portions of said arms are permitted to move toward each other, when it is desired to disengage the tire vise from the tire.

It further consists of a novel construction of pawl and ratchet mechanism and means for manually operating the same when it is desired to unlock the pawl from its ratchet.

It further consists of other novel features of construction and advantage all as will hereinafter appear in the detailed description of the invention.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a tire vise, embodying my invention, showing the manner of its application to an automobile tire or shoe.

Fig. 2 represents a plan view of the tire vise, a portion of the same being shown in section on line 2—2 of Fig. 4.

Fig. 3 represents a section on line 3—3 of Fig. 2.

Fig. 4 represents an end view of Fig. 2.

Fig. 5 represents a detail view showing the position of the ratchet teeth on one of the arms employed.

Fig. 6 represents a perspective view of the pawl or locking device employed in detached position.

Similar numerals of reference indicate corresponding parts.

Referring to the drawings:—

1 designates my novel construction of tire vise, the same comprising the pair of angular arms 2 and 3 and 4 and 5 respectively, said arms 3 and 5 terminating in the hooks 6 and 7 respectively, which are open outwardly, whereby the longer members 8 and 9 of said hooks are adapted to engage the juxtaposed edges or walls 10 of a tire or shoe 11, so as to spread the same apart as seen in Fig. 1 in order to facilitate the insertion or withdrawal of an inner tube 12. In order to provide means for holding and locking the hook members 8 and 9 open, I provide the arm 2 with a series of ratchet teeth 13, which are preferably arranged in the arc of a circle and are adapted to be engaged by the nose 14 of the pawl 15, which is mounted on the stem or spindle 16, having the threaded outer end 17, which is engaged by the nut 18. I preferably locate the ratchet teeth 13 on the central tongue member of the arm 2, which is retained between the outer contiguous members of the arm 4, as will be understood from Figs. 2, 3 and 5. The stem 16 and the pawl 15 are mounted in the chamber 19 of the arm 4, said pawl being shaped to conform to the walls of said chamber, so as to be guided therein and the spring 20 in said chamber by reason of its contact with said pawl, causes the nose 14 of the latter to normally contact or interlock with the ratchet teeth 13, said nose being disengaged therefrom by pressure on the finger piece 21 of the lifting member 22, which has a hole therein, through which said stem passes, said member 22 being located between the nut 18 and the end of the arm 4. The arms 2 and 4 are held in pivotal relation by the screw 23, which forms a hinged connection therefor.

The operation is as follows:—

The hook members 6 and 7 are initially brought a little closer together than seen in Fig. 2, and are engaged with the juxtaposed walls of the tire or shoe which it is desired to open. The arms 3 and 5 are then pulled outwardly, so that the hooks move away from each other, which spread open the inner walls of the tire, and the engagement of the nose 14, of the pawl 15 with the ratchet teeth 13 will hold said arms apart and will retain the edges of the shoe in open position, so that the inner tube 12 can be readily inserted, or withdrawn from the shoe 11, it being understood that a plurality of the tire vises may be employed if desired. After the inner tube is positioned within the shoe, the operator by pressing on the finger piece 21, pulls the stem 16 outwardly, and the pawl being disengaged from its ratchet, the arms 3 and 5 can be readily moved toward each other by reason of the hinge or pivotal connection 23 and then disengaged from the shoe.

It will of course be understood that when a plurality of the tire vises are employed in connection with the inner periphery of the shoe or tire with respect to which it is desired to insert or withdraw the inner tube, the same may be spaced apart on the shoe at about equal intervals so that practically the entire area of the inner peripheral edges of the shoe are open, and accessible, and when it is desired to withdraw the vises, it is only necessary to disengage the pawl from the ratchet teeth, which is instantaneously effected by the manipulation of the finger piece 21.

My novel device can be cheaply constructed, is effective and durable in its operation and will not readily get out of order, as is evident.

I preferably give the arms 3 and 5, substantially the contour of handles, which can be readily grasped and pulled apart or away from each other, so as to cause the device to assume the position seen in Fig. 1.

It will be further apparent that my novel tire vise can be readily taken apart for the purposes of inspection or repair, by removing the screw 23, after which the arms 2 and 4 can be separated and upon removal of the nut 18, the pawl mechanism 16 and the spring can be readily withdrawn, as is evident.

It will now be apparent that I have devised a novel and useful tire vise which embodies the features of advantage enumerated as desirable in the statement of the invention and the above description and in appended claims, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a tire vise, a plurality of arms having hooks at their outer ends, adapted to engage tire walls, a pivotal connection for the opposite ends of said arms, ratchet teeth annularly arranged on one of said arms, in proximity to said pivotal connection and a spring pressed pawl carried by the other of said arms, and adapted to engage said ratchet teeth to retain said arms and tire walls in open position.

2. In a tire vise, a plurality of angular arms having hooks at their outer ends, said hooks being open outwardly, a pivotal connection for the opposite ends of said arms, ratchet teeth annularly arranged on one of said arms, the other of said arms having a chamber therein, a pawl in said chamber having a nose engaging said ratchet teeth, and a spring in said chamber for normally holding said nose in engagement with said ratchet teeth.

3. In a tire vise, a plurality of angular arms having hooks at their outer ends, said hooks being open outwardly, a pivotal connection for the opposite ends of said arms, ratchet teeth annularly arranged on one of said arms, the other of said arms having a chamber therein, a pawl in said chamber having a nose engaging said ratchet teeth, and a spring in said chamber for normally holding said nose in engagement with said ratchet teeth, in combination with a finger piece connected with the outer extremity of the pawl mechanism for unlocking the nose of said pawl from said ratchet teeth.

4. In a tire vise, a plurality of angular arms having their juxtaposed ends pivotally connected and their opposite ends provided with hooks open outwardly, an annular series of ratchet teeth arranged on one of said arms in proximity to said pivotal connection, a pawl having a nose adapted to engage said ratchet teeth, a spring bearing on said pawl for causing the latter to engage said ratchet teeth, a spindle attached to said pawl and surrounded by said spring, the outer end of said spindle being threaded and having a nut thereon, and a finger piece intermediate said nut and arm and having a hole therein through which said spindle passes, whereby the nose of said pawl can be unlocked from said ratchet teeth, when said finger piece is depressed.

5. In a tire vise, a pair of angular arms pivoted together, and having hooks at their opposite ends which are open outwardly, a tongue member on one of said arms having ratchet teeth annularly arranged thereon, said tongue member being retained between the outer contiguous members of the other arm, a spring actuated pawl mechanism engaging said ratchet teeth to hold said arms open and a manually operated finger piece for actuating said pawl mechanism.

ELMER QUINN.

Witnesses:
C. D. McVay,
N. Bussinger.